United States Patent
Adams et al.

(10) Patent No.: US 9,185,056 B2
(45) Date of Patent: Nov. 10, 2015

(54) SYSTEM AND METHODS FOR CONTROLLING NETWORK TRAFFIC THROUGH VIRTUAL SWITCHES

(75) Inventors: Robert Edward Adams, San Mateo, CA (US); Mandeep Singh Dhami, San Jose, CA (US); Daniel E. Talayco, Sunnyvale, CA (US); Guido Appenzeller, Menlo Park, CA (US); R. Kyle Forster, San Francisco, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 169 days.

(21) Appl. No.: 13/237,806

(22) Filed: Sep. 20, 2011

(65) Prior Publication Data

US 2013/0070762 A1   Mar. 21, 2013

(51) Int. Cl.
*H04L 12/28* (2006.01)
*H04L 12/931* (2013.01)
*H04L 12/24* (2006.01)

(52) U.S. Cl.
CPC ............ *H04L 49/70* (2013.01); *H04L 41/0893* (2013.01)

(58) Field of Classification Search
CPC .......................... H04L 49/70; H04L 12/4641
USPC .......... 370/252, 229, 389, 401; 709/224, 332, 709/220
See application file for complete search history.

(56) References Cited

U.S. PATENT DOCUMENTS

| | | |
|---|---|---|
| 5,751,967 A | 5/1998 | Raab |
| 5,892,912 A | 4/1999 | Suzuki |
| 6,674,756 B1 | 1/2004 | Rao |

(Continued)

FOREIGN PATENT DOCUMENTS

| | | |
|---|---|---|
| EP | 0971511 | 1/2000 |
| EP | 1351441 | 10/2003 |

(Continued)

OTHER PUBLICATIONS

Cisco: "Layer 2 Switching", 1-24 Internet Citation, May 22, 2009, pp. 9-1, XP002686719, Retrieved from the Internet:URL:http://www.cisco.com/en/U5/docs/switches/datacenter/nexuslOOO/sw/4_2_1_sv_1_4/troubleshooting/configurati on/gui de/nl000vtroubie_9l ayer2 pdf [retrieved on Nov. 8, 2012].

(Continued)

*Primary Examiner* — Jeffrey M Rutkowski
*Assistant Examiner* — Romani Ohri
(74) *Attorney, Agent, or Firm* — Treyz Law Group; Michael H. Lyons

(57) ABSTRACT

A network may include network switches with network switch ports that may be coupled to end hosts. The network switches may be controlled by a controller such as a controller server. Virtual switches may be formed using the controller from groups of the network switch ports and the end hosts. Each virtual switch may include virtual interfaces associated with end hosts or network switches. Virtual links may be formed that define network connections between the virtual interfaces and end hosts or between two virtual interfaces. Virtual network policies such as selective packet forwarding, packet dropping, packet redirection, packet modification, or packet logging may be implemented at selected virtual interfaces to control traffic through the communications network. The controller may translate the virtual network policies into network switch forwarding paths that satisfy the virtual network policies.

25 Claims, 17 Drawing Sheets

(56) References Cited

U.S. PATENT DOCUMENTS

| | | | |
|---|---|---|---|
| 7,756,027 | B1 | 7/2010 | Reddy et al. |
| 7,860,120 | B1 | 12/2010 | Wang et al. |
| 8,199,750 | B1* | 6/2012 | Schultz et al. ............. 370/389 |
| 8,565,108 | B1* | 10/2013 | Marshall et al. ............. 370/252 |
| 2004/0013120 | A1* | 1/2004 | Shen ................. 370/395.31 |
| 2004/0139236 | A1* | 7/2004 | Mehra et al. .............. 709/250 |
| 2005/0144268 | A1* | 6/2005 | El-Batal et al. ............. 709/223 |
| 2006/0031374 | A1* | 2/2006 | Lu et al. ................. 709/207 |
| 2008/0112403 | A1 | 5/2008 | Larsen et al. |
| 2008/0189769 | A1* | 8/2008 | Casado et al. ............... 726/4 |
| 2008/0301759 | A1 | 12/2008 | Rivers et al. |
| 2009/0279701 | A1* | 11/2009 | Moisand et al. ........... 380/270 |
| 2010/0115101 | A1 | 5/2010 | Lain et al. |
| 2010/0131636 | A1 | 5/2010 | Suri et al. |
| 2010/0232290 | A1 | 9/2010 | Wong et al. |
| 2010/0242093 | A1* | 9/2010 | Zuk et al. ................. 726/3 |
| 2010/0251329 | A1* | 9/2010 | Wei ...................... 726/1 |
| 2011/0019544 | A1 | 1/2011 | Lemaire et al. |
| 2011/0035494 | A1 | 2/2011 | Pandey et al. |
| 2011/0103259 | A1 | 5/2011 | Aybay et al. |
| 2011/0268125 | A1* | 11/2011 | Vobbilisetty et al. .... 370/395.53 |
| 2012/0170477 | A1 | 7/2012 | Hieda |
| 2013/0058354 | A1* | 3/2013 | Casado et al. ............. 370/401 |

FOREIGN PATENT DOCUMENTS

| | | |
|---|---|---|
| WO | 9747113 | 12/1997 |
| WO | 2011092410 | 8/2011 |
| WO | 2012090996 | 7/2012 |

OTHER PUBLICATIONS

Pfaff et al., OpenFlow Switch Specification, Dec. 31, 2009, 42 pages.

McKeown et al., OpenFlow: Enabling Innovation in Campus Networks, Mar. 14, 2008, 6 pages.

Casado et al., "SANE: A Protection Architecture for Enterprise Networks," Usenix Security, Aug. 2006 (15 pages).

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al., "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf>.

Cisco Router Configuration Tutorial. Tutorial [online]. Gentry, Apr. 30, 2006 [retrieved on May 9, 2011]. Retrieved from the Internet: <URL:http://pages.swcp.com/~jgentry/topo/cisco.htm#sect3>.

Salvadori et al., "Demonstrating Generalized Virtual Topologies in an OpenFlow Network", p. 458-459, SIGCOMM'11, Aug. 15-19, 2011, Toronto, Ontario, Canada.

Koide et al., "A consideration on large-scale OpenFlow networks using Source Flow based technique", Institute of Electronics, Information and Communication Engineers Technical Report, NS2010-221, Japan, Feb. 24, 2011, vol. 110, No. 448, pp. 335-340.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

NETWORK POLICY                                     92

ALLOW END HOSTS ASSOCIATED WITH VIRTUAL
SWITCH VSW1 TO ACCESS END HOSTS ASSOCIATED
WITH VIRTUAL SWITCH VSW2 USING HTTP PROTOCOL

FIG. 10A

VIRTUAL INTERFACE POLICY                           94A

| INTERFACE | ALLOW/DENY | INGRESS/EGRESS | OTHER ATTRIBUTES |
|---|---|---|---|
| IF3 | ALLOW | INGRESS | DESTINATION TCP PORT = 80 |
| IF3 | ALLOW | EGRESS | SOURCE TCP PORT = 80 |

FIG. 10B

VIRTUAL INTERFACE POLICY                           94B

| INTERFACE | ALLOW/DENY | INGRESS/EGRESS | OTHER ATTRIBUTES |
|---|---|---|---|
| IF2 | ALLOW | INGRESS | SOURCE TCP PORT = 80 |
| IF2 | ALLOW | EGRESS | DESTINATION TCP PORT = 80 |

FIG. 10C

FLOW TABLE ENTRIES

SW 1                                                              96A

| ... PHYSICAL INPUT PORT | ... | DESTINATION IP ADDRESS | ... | DESTINATION TCP PORT | ... | ACTION |
|---|---|---|---|---|---|---|
| A | | 10.0.0.1 | | 80 | | SEND TO PORT C |
| C | | 10.0.0.2 | | * | | SEND TO PORT A |

SW 3                                                              96B

| ... DESTINATION IP ADDRESS | ... | ACTION |
|---|---|---|
| 10.0.0.1 | | SEND TO PORT I, DECREMENT TIME-TO-LIVE HEADER |
| 10.0.0.2 | | SEND TO PORT H, DECREMENT TIME-TO-LIVE HEADER |

SW 4                                                              96C

| ... PHYSICAL INPUT PORT | ... | DESTINATION IP ADDRESS | ... | SOURCE TCP PORT | ... | ACTION |
|---|---|---|---|---|---|---|
| L | | 10.0.0.2 | | 80 | | SEND TO PORT J |
| J | | 10.0.0.1 | | * | | SEND TO PORT L |

FIG. 10D

SYSTEM AND METHODS FOR CONTROLLING NETWORK TRAFFIC THROUGH VIRTUAL SWITCHES

BACKGROUND

This relates to communication networks, and more particularly, to forwarding network packets through communication networks.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Each network switch on which a controller client has been implemented may include a flow table with entries that specify how packets are to be forwarded by that switch. A controller server routes traffic through the network by modifying the flow tables of the network switches to create data paths. For example, the controller can communicate with each network switch associated with a desired path to route a data packet from a packet source to a packet destination.

The controller server may implement network policies that control the flow of network packets through the network. For example, the controller server can block network traffic between selected packet sources and packet destinations. It may be difficult to implement network policies in networks that include many switches (e.g., tens, hundreds, thousands of switches or more), because each network policy may require modifications to the flow tables of many network switches.

It would therefore be desirable to be able to provide improved arrangements for applying network policy to a communications network.

SUMMARY

A packet based network may be formed from network switches that are coupled via network connections. The network switches may include controller clients. The controller clients may be configured to form forwarding paths for packets flowing through the network. With one suitable arrangement, a controller server may be used to configure the network switches by communicating with the controller clients.

The switches in the network may be grouped to form virtual switches. For example, a network administrator may provide user input to the controller server that identifies the ports to include in each virtual switch. The ports included may be dynamically determined based on end host identification such as a network address. Virtual switches can contain resources selected from multiple switches or parts of switches. For example, a virtual switch may contain selected ports from multiple switches. The virtual switches may include interfaces to which the resources are assigned. Network administrators can use the controller server to adjust which ports are grouped to form each virtual switch to facilitate network administration tasks. For example, an administrator may assign a group of ports that are associated with a first set of end hosts to a first virtual switch and may assign a group of ports associated with a second set of end hosts to a second virtual switch. The administrator may then define network policies to be applied to packet traffic flowing through virtual paths through the virtual switches. The network policies may be applied at selected interfaces of the virtual switches.

When packets are received by switches in the network, the controller server may use information associated with the packets to determine which of the network policies should be applied to the network packet. The information associated with the packets may include packet source and destination addresses, which protocol port is associated with the packet, which network protocol is associated with the packet, and other packet information. The network policies may include policies such as "drop packets," "allow packets," "modify packets," and other policies.

The controller server may identify a virtual path through the virtual switches that is associated with a received packet. For example, the controller server may identify a virtual path through interfaces of the virtual switches from a packet source to a packet destination. The virtual path may include interfaces at which network policy has been applied by a network administrator. The controller server may define an overall network policy for the packet based on the identified virtual path and the identified virtual policy. Based on the identified virtual path and the identified overall network policy, the controller server can translate the virtual path into a corresponding network switch forwarding path through appropriate network switches that satisfies the identified overall network policy. The controller server can configure the switches in the network so that the switches can forward the received packet along the network switch forwarding path. For example, the controller server can provide the switches with flow table entries or other information that configures the switches to perform suitable packet forwarding operations.

The controller server can be used in forwarding packets from a packet source to a packet destination through a network of switches, each of which includes ports that are grouped by a user to form virtual switches. The controller server can be used to identify a packet source and packet destination associated with a given packet from information in the given packet (e.g., a source address and a destination address). Using this information on the packet source and destination, the controller server can identify a virtual path through the virtual switches. The virtual path may pass through multiple virtual switches. For example, the virtual path may pass through a first virtual switch associated with the packet source and a second virtual switch associated with the packet destination (among other possible virtual switches). After identifying the virtual path, the controller server can use the identified virtual path and a network policy to generate a packet forwarding path through the switches in the network from the packet source to the packet destination.

To form the packet forwarding path, the controller server may selectively configure some of the switches in the network to implement the overall network policy. The switches configured in this way may be selected based on switch capabilities such as whether the switch is capable of modifying or redirecting the packets.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

FIG. 10A is a diagram of an illustrative network policy that may be applied to a virtual switch network in accordance with an embodiment of the present invention.

FIG. 10B is a diagram of a first set of illustrative virtual interface policies that may be applied to a virtual switch network in accordance with an embodiment of the present invention.

FIG. 10C is a diagram of a second set of illustrative virtual interface policies that may be applied to a virtual switch network in accordance with an embodiment of the present invention.

FIG. 10D is a diagram of illustrative flow table entries that may correspond to a set of virtual interface policies in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
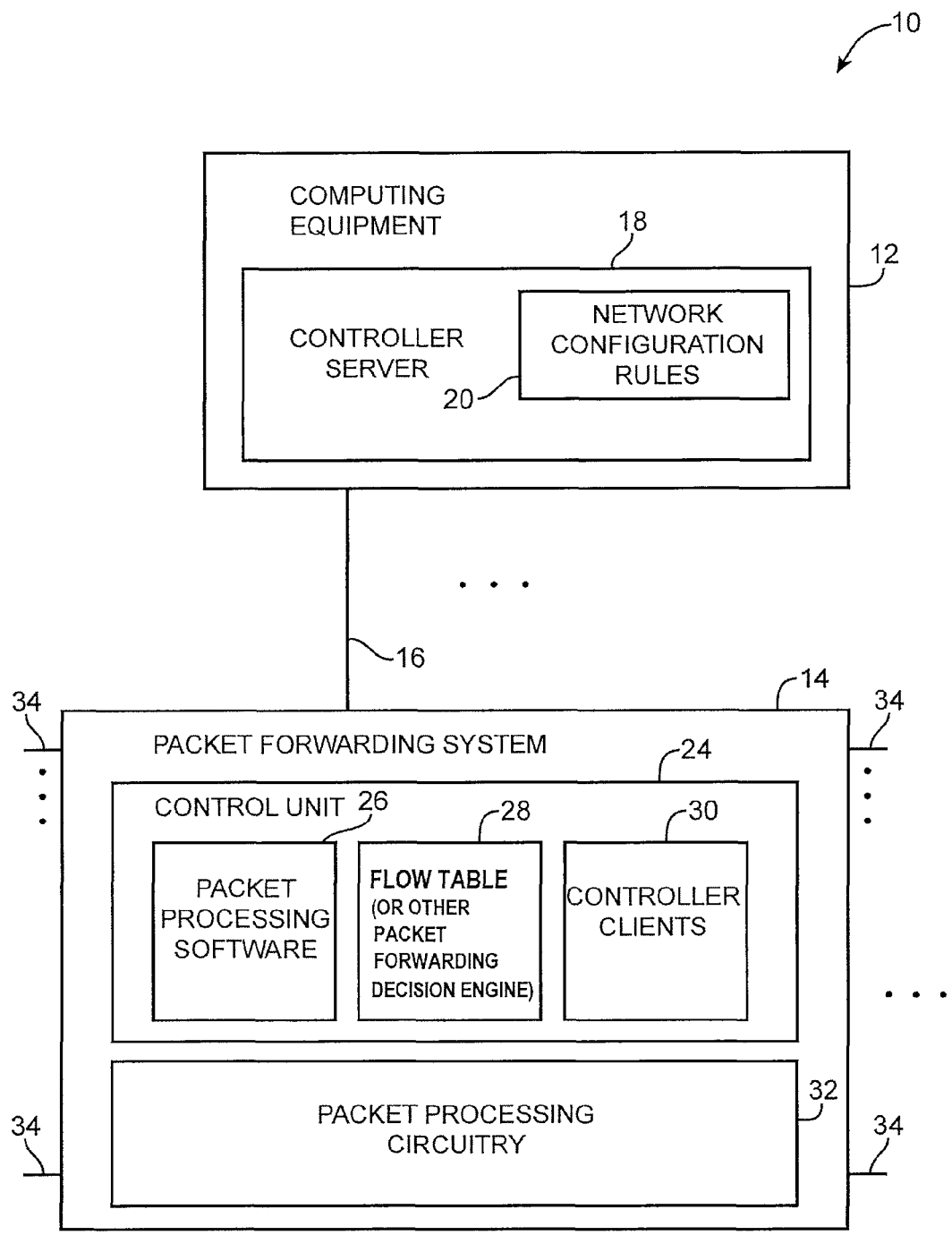
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 10 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. Any packet forwarding decision engine may be used to assist packet forwarding system 14 to make decisions about how to forward network packets. For example, packet forwarding decision engines 28 may direct packet forwarding system 14 to forward network packets to predetermined ports based on attributes of the network packets (e.g., based on network protocol headers).

Figure 2:
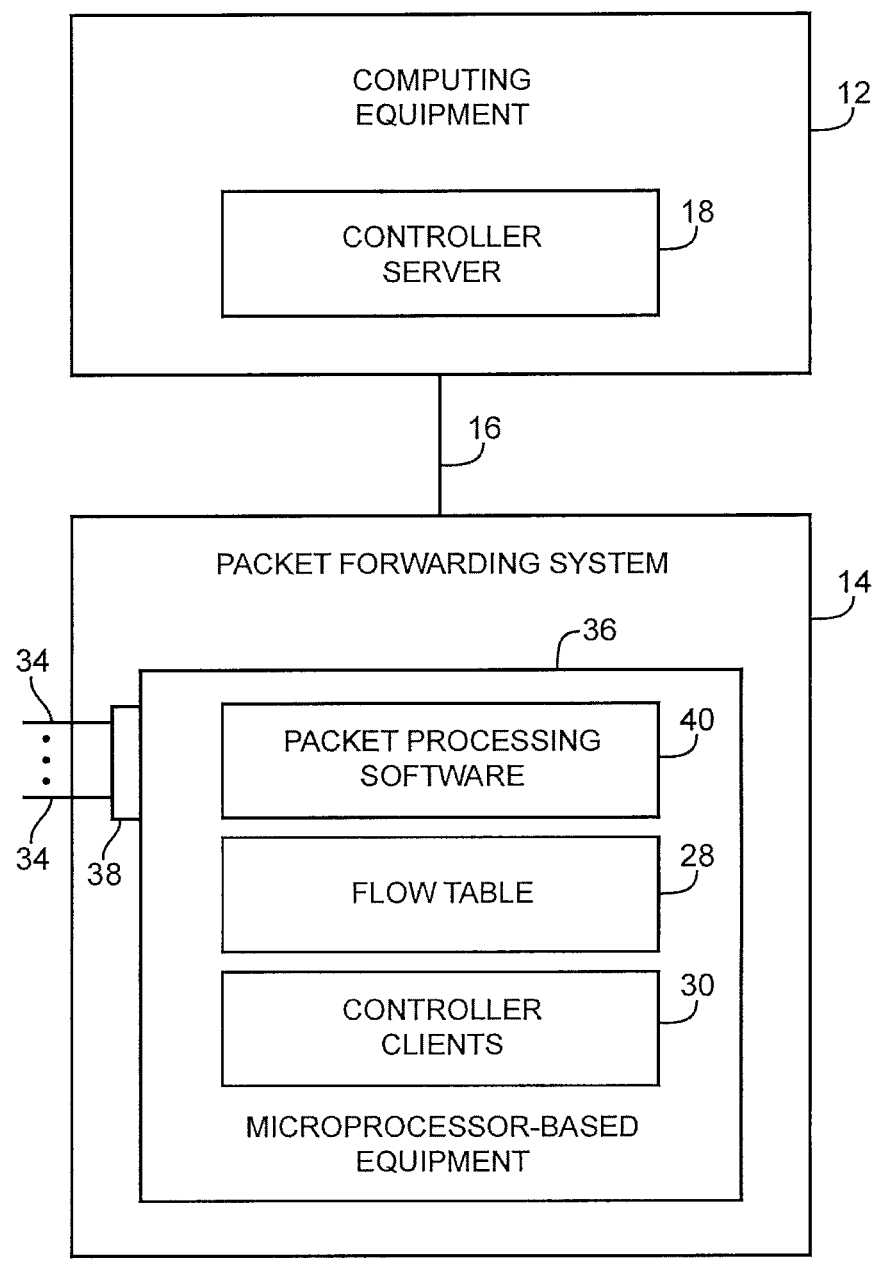
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
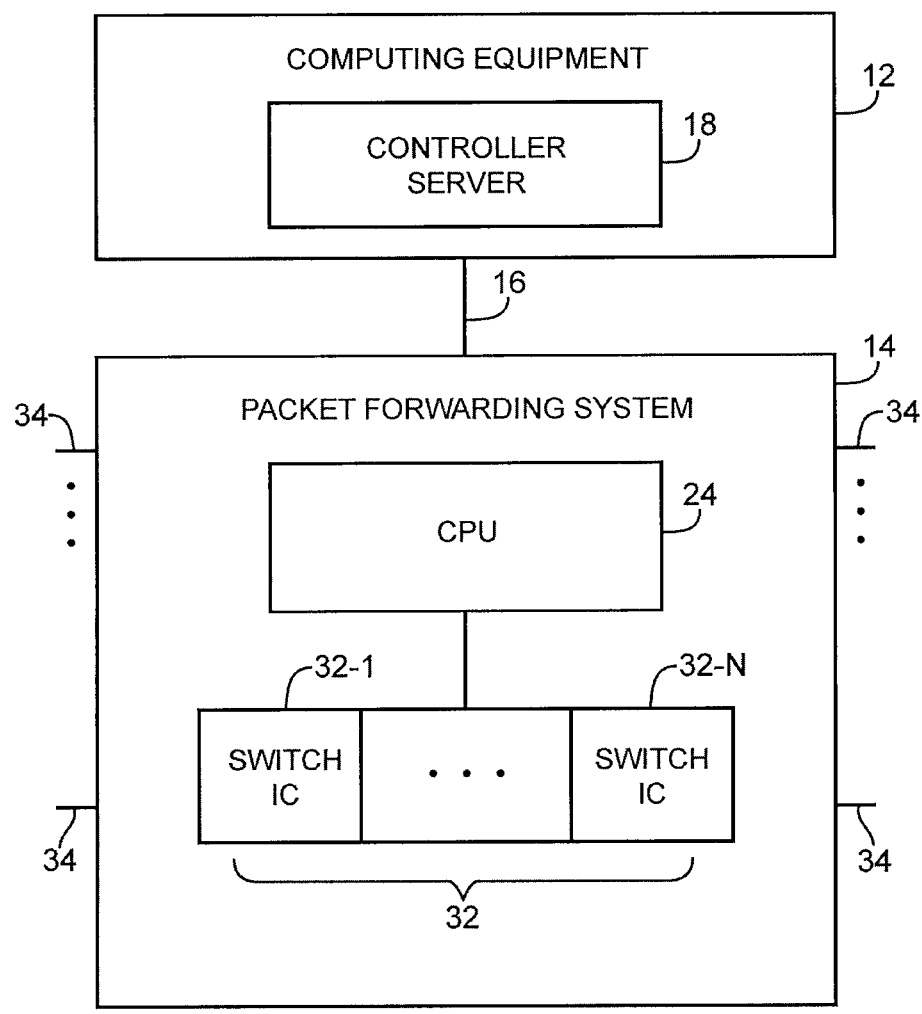
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
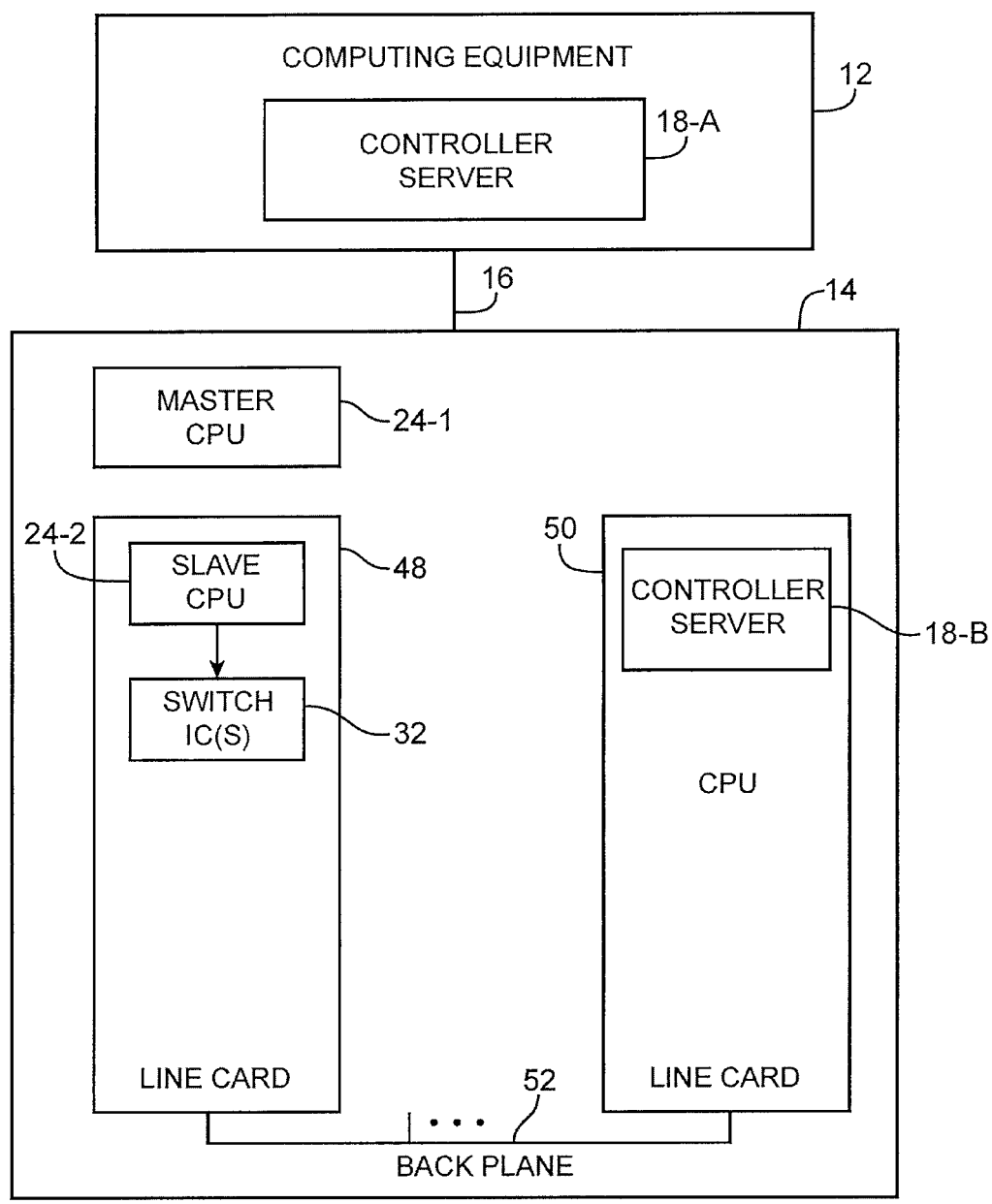
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch (packet forwarding system) 14 may include a master processor such as processor 24-1 and one or more associated slave processors such as slave processor 24-2. Switch ICs 32 and slave processors such as processor 24-2 may be implemented on line cards such as line card

48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
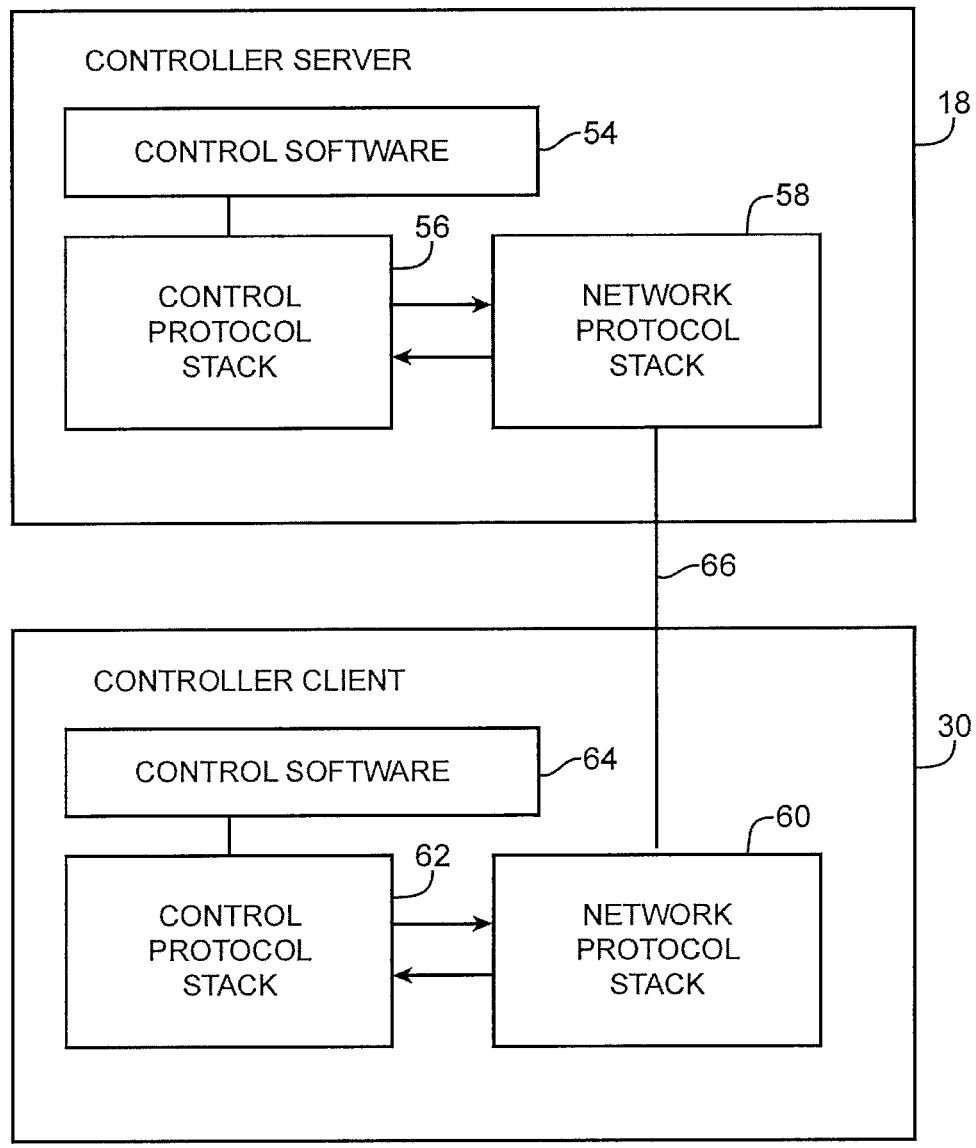
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
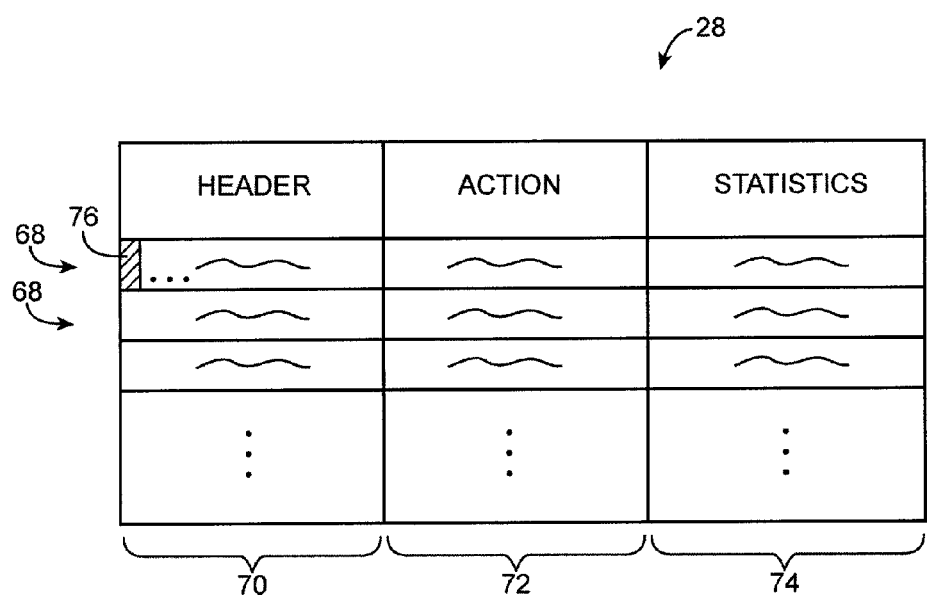
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port, a drop action (e.g., to drop a packet that matches a flow table entry with no specified action), a redirect action to redirect packets to packet destinations other than the packet destinations specified by the packets. Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14.

In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
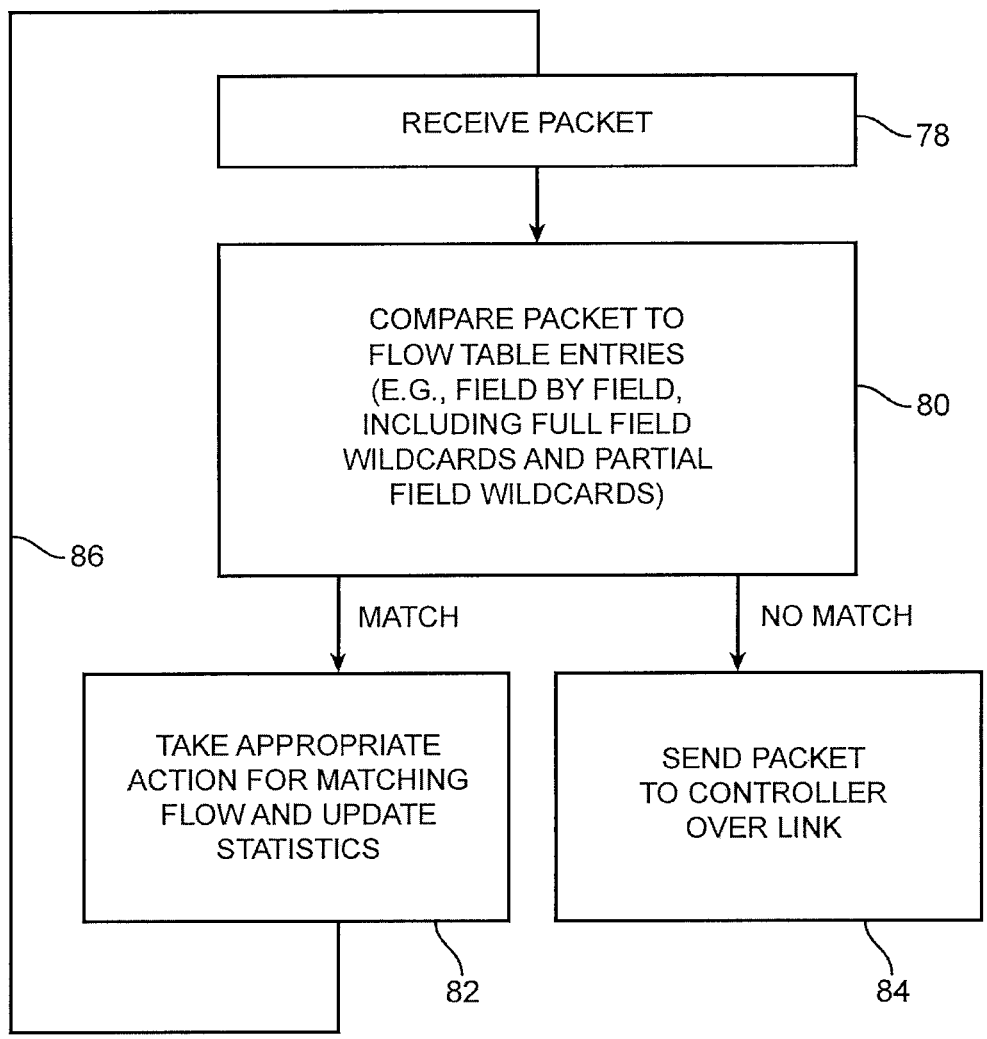
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
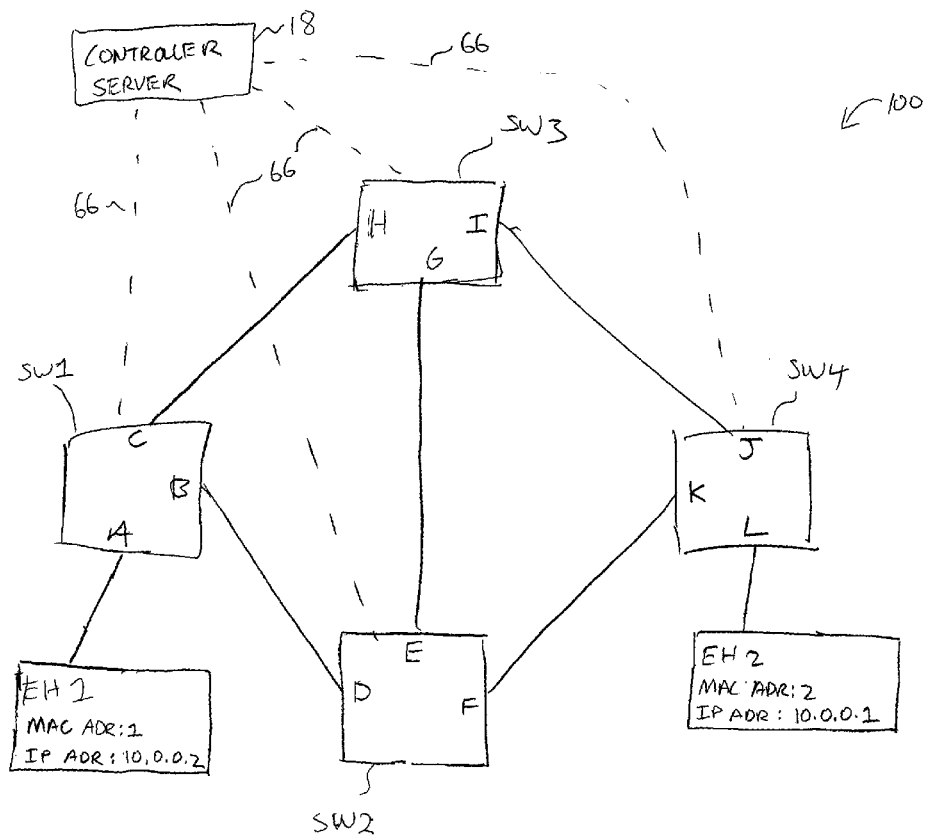
FIG. 8 is a diagram of a network with a controller server that may communicate with controller clients to generate a network switch forwarding path between first and second end hosts in accordance with an embodiment of the present invention.

FIG. 8 shows an illustrative network with switches (e.g., or other packet forwarding systems) with controller clients (e.g., client switches SW1, SW2, SW3, and SW4) and a controller server 18 that may control the client switches via paths 66. The client switches may be coupled to other network elements via ports on the client switches. For example, client switch SW1 may be coupled to a first end host EH1 via port A, to client switch SW3 via port C, and to client switch SW2 via port B.

Network 100 may include end hosts such as end host EH1 coupled to switch SW1 and end host EH2 coupled to switch SW4. Each end host may have a corresponding network address. For example, end host EH1 may have a media access control (MAC) address of one and an internet protocol (IP) address of 10.0.0.2 and end host EH2 may have a MAC address of two and an internet protocol (IP) address of 10.0.0.1.

End hosts may communicate with other end hosts by transmitting data through the switches of network 100. For example, end host EH1 may transmit a network packet to switch SW1 that is destined for switch SW4. Switch SW1 may forward the network packet along a network switch forwarding path (e.g., a forwarding path that includes network switches SW1, SW3, and SW4) so that end host EH2 receives the network packet. The network switch forwarding path may be generated by controller server 18 (e.g., by providing the network switches with appropriate flow table entries that direct the switches to forward network packets from end host EH1 to end host EH2).

It may be desirable to form groups from subsets of the ports on the client switches and/or from network elements such as end hosts. For example, electronic payment clients (e.g., devices used to communicate with electronic payment servers to perform payment transactions) may be coupled to some of the ports on the client switches in the network. It may be desirable to form a first group from the electronic payment clients and a second group from the electronic payment servers to more conveniently control network traffic associated with the electronic payment clients (e.g., to prevent sensitive payment information such as credit card numbers from being transmitted to other devices, it may be desirable to prevent packets originating from the ports associated with the electronic payment clients from reaching destinations other than the electronic payment server).

To form a group from a subset of the ports of the client switches (e.g., from network switch ports) and from network elements such as end hosts, controller server 16 may create a virtual switch. As an example, a virtual switch may be formed from a subset of ports and end hosts in network 100 that correspond to electronic payment clients. Each virtual switch may have virtual interfaces that correspond to one or more respective ports from the switch ports or to one or more respective end hosts. The virtual interfaces may represent a border between traffic internal to the virtual switch (e.g., network traffic between virtual interfaces of the virtual switch) and traffic external to the virtual switch (e.g., traffic destined to or received from ports or end hosts not associated with the virtual switch).

Figure 9:
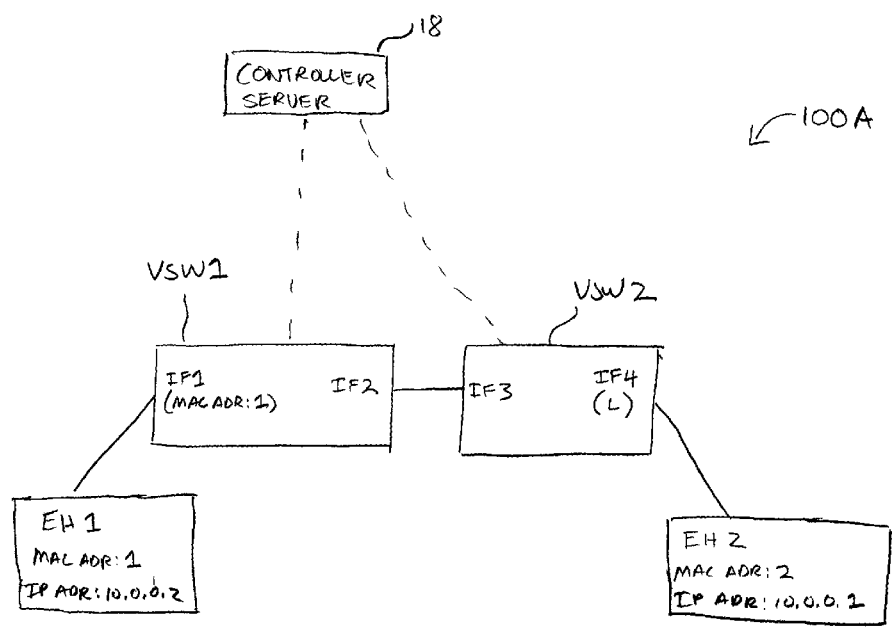
FIG. 9 is a diagram of a virtual switch network with virtual switches each formed from a subset of network resources and end hosts in accordance with an embodiment of the present invention.

An illustrative virtual network 100A that may include virtual switches associated with end hosts and/or network switch ports of network 100 is shown in FIG. 9. Virtual network 100A may include a first virtual switch VSW1 and a second virtual switch VSW2. Each virtual switch may include interfaces that link that virtual switch with other virtual switches or with network elements such as end hosts or network switch ports. Virtual switch VSW1 may include interface IF1 that links virtual switch VSW1 with end host EH1 and interface IF2 that links virtual switch VSW1 with virtual switch VSW2. Virtual switch VSW2 may include interface IF3 that links VSW2 to VSW1 and interface IF4 that links VSW2 to end host EH2.

Virtual switch interfaces such as IF1 and IF2 may be associated with static physical interfaces or dynamically updated based on the locations of end hosts within a corresponding physical network (e.g., network 100 of FIG. 8). Interface IF1 of virtual switch VSW1 may be linked to a Media Access Control (MAC) address of zero (e.g., interface IF1 may be dynamically updated to represent a network switch port to which an end host that has a MAC address of zero is coupled).

Interface IF2 of virtual switch VSW2 may be linked to physical port L of network switch SW4 (e.g., interface IF2 may be statically linked to port L).

The example of assigning an end host to a virtual switch interface based on an associated MAC address is merely illustrative. If desired, any combination of network identification tags may be used to assign an end host to a virtual switch interface. For example, end hosts may be assigned to virtual switch interfaces using any combination of MAC address, Internet Protocol (IP) address, virtual local area network (VLAN) identifiers, identification tags based on lookup-tables, etc. If desired, one or more ports that are associated with a given end host may be assigned to a virtual switch (e.g., physical ports that are coupled to the given end host may be assigned to the virtual switch and may be updated to reflect where the location at which the given end host is coupled to the network). The network locations (e.g., switches and switch ports to which the end hosts are coupled to) of end hosts assigned to virtual switch interfaces in this way may be dynamically updated to reflect changes in the network.

Controller server 18 may be used to apply network policies that control network traffic through network 100. Network policies that may be applied by controller server 18 may include packet forwarding rules, access control rules, packet redirection rules, or other policies that control the flow of network traffic through network 100.

It may be desirable to apply network policies to virtual network switches such as VSW1 and VSW2 of FIG. 9 instead of network switches such as SW1, SW2, SW3, and SW4 of FIG. 8. For example, to help apply network policies for network security cameras and network security computers (e.g., computers used by network security personnel to operate the network security cameras), a first virtual switch may be formed from end hosts that correspond to the network security cameras and a second virtual switch may be formed from end hosts that correspond to the network security computers. In this scenario, a network administrator may use controller server 18 to implement a network policy that allows only the network security computers to access the network security cameras (e.g., without allowing other end hosts to access the network security cameras). By controlling virtual switches instead of individual controlling each physical switch in the network, the network administrator may more efficiently implement the network policy (e.g., because there may be fewer virtual switches to control). Network policies applied to a virtual network may sometimes be referred to herein as virtual network policies.

FIG. 10A shows an illustrative virtual network policy 92 that may be applied to virtual network 100A (e.g., using controller server 18). Virtual network policy 92 may allow end hosts associated with virtual switch VSW1 to access end hosts associated with virtual switch VSW2 using the hypertext transport protocol (HTTP) while denying all other network traffic between virtual switch VSW1 and virtual switch VSW2. For example, network security computers may communicate with network security cameras using the hypertext transport protocol. To allow the network security computers to access the network security cameras without allowing unauthorized network devices to access the network security cameras, the virtual network policy may allow only hypertext transport protocol traffic that is from virtual switch VSW1 to reach virtual switch VSW2 (and vice versa).

To implement virtual network policy 92, controller server 18 may implement corresponding virtual interface policies at selected virtual interfaces. The virtual interface policies may be stored at controller server 18 (e.g., in a table or database). FIG. 10B shows an illustrative example of virtual interface policies that may be applied at interface IF3 of virtual switch VSW2. In the example of FIG. 10B, ingress network packets with destination transport control protocol (TCP) ports of 80 and egress network packets with source TCP ports of 80 may be allowed to pass through virtual interface IF3, while network packets with other attributes may be blocked or dropped. In this way, network security computers and network security cameras communicating using the hypertext transport protocol may send and receive network packets using TCP port 80 (as an example).

Virtual network policy may be applied at any desired virtual interface. For example, a virtual network policy that allows network security computers (e.g., end host EH1) to access network security cameras (e.g., end host EH2) may be applied at interfaces IF1, IF2, IF3, IF4, or any combination of the interfaces in a virtual network path from the network security computers to the network security cameras (e.g., a virtual network path through any desired number of virtual network switches). FIG. 10C shows how virtual network policy 92 may be applied at interface IF2 of virtual switch VSW1. In the example of FIG. 10C, ingress network packets with source transport control protocol (TCP) ports of 80 and egress network packets with destination TCP ports of 80 may be allowed to pass through virtual interface IF2, while network packets with other attributes may be blocked or dropped to prevent unauthorized network traffic between end hosts EH1 and EH2.

The example of FIG. 9 in which only a single virtual switch path exists between end hosts EH1 and EH2 is merely illustrative. If desired, additional virtual switches may be formed that provide alternate virtual switch paths from end host EH1 to end host EH2. To implement virtual network policy such as virtual network policy 92, controller server 92 may be used to apply virtual interface policies at selected virtual interfaces in each possible virtual switch path between end hosts EH1 and EH2 (e.g., to ensure that network packets cannot avoid complying with the virtual network policy).

Virtual network policy may be applied to a corresponding physical network (e.g., a physical network of switches or other packet forwarding systems). Controller server 18 may translate virtual network policies that control traffic between virtual network switches into network switch forwarding rules that control network traffic through a corresponding physical network. Each virtual interface policy may be translated into a corresponding set of network switch forwarding rules (e.g., flow table entries) that are provided to packet forwarding systems in the physical network.

FIG. 10D shows illustrative flow table entries that may be provided to switches in physical network 100 to implement virtual network policy 92 of FIG. 10A. In the example of FIG. 10D, controller server 18 may identify a network switch routing path between end host EH1 (e.g., a network security computer) and end host EH2 (e.g., a network security camera) that includes switches SW1, SW3, and SW4. Controller server 18 may provide flow table entries 96A to switch SW1, flow table entries 96B to switch SW3, and flow table entries 96C to switch SW4. The flow table entries may forward network packets between end hosts EH1 and EH2 while implementing network policy 92 (e.g., the flow table entries may only allow network traffic between end hosts EH1 and EH2 that use TCP port 80).

Flow table 96A may include a first entry that directs switch SW1 to forward network packets received at physical input port A with destination IP addresses 10.0.0.1 and destination TCP ports 80 to port C. Flow table 96A may include a second entry that directs switch SW1 to forward network packets received at physical input port C with destination IP addresses 10.0.0.2 to port A (e.g., regardless of destination TCP ports of the network packets).

Flow table 96B may include a first entry that directs switch SW3 to forward network packets with destination IP addresses 10.0.0.1 to port I and simultaneously decrement a time-to-live (TTL) network packet header field. Flow table 96B may include a second entry that directs switch SW3 to forward network packets with destination IP addresses 10.0.0.2 to port H and simultaneously decrement a time-to-live network packet header field.

The time-to-live header field may indicate a number of network elements that a network packet may traverse before being dropped by the network. For example, end host EH1 may send network packets with a given time-to-live (TTL) value stored in the TTL network packet header field (e.g., a value of 64, 128, 255, etc.). By decrementing the time-to-live network packet header field, switches in network 100 may prevent network packets from traversing network switch forwarding paths that are longer than the original value stored in the time-to-live network packet header field (e.g., because the network packets may be dropped when the value of the time-to-live header field reaches zero).

The example of switch SW3 being used to decrement time-to-live (TTL) header fields of network packets is merely illustrative. If desired, any switch in the network path from end host EH1 to end host EH2 may be provided with flow table entries that direct that switch to decrement TTL header fields. If desired, the switches in the network path may be used to implement other virtual network policies (e.g., policies that selectively redirect network traffic away from end host EH2 or modify network traffic sent from end host EH1). For example, controller server 18 may select any suitable switch (e.g., a network switch with appropriate switch capabilities) to implement virtual network policies such as modifying source IP address fields, modifying MAC address fields, modifying VLAN header fields, etc. The virtual network policies may be applied as part of a broader network policy such as a virtual network policy that implements a virtual router or a virtual bridge between selected ports of one or more virtual switches (e.g., between selected end hosts or selected physical ports).

Flow table 96C may include a first entry that directs switch SW4 to forward network packets from physical input port L with destination IP addresses 10.0.0.2 and source TCP ports 80 to port J and a second entry that directs switch SW4 to forward network packets received at physical input port J with destination IP address 10.0.0.1 to port L (e.g., regardless of source TCP port).

The flow table entries of flow tables 96A, 96B, and 96C may generate a network switch forwarding path between end hosts EH1 and EH2 through switches SW1, SW3, and SW4. Virtual network policy 92 may be implemented throughout the generated network switch forwarding path. For example, network policy may be partially applied at switch SW1 (e.g., the first entry of table 96A may only allow network packets from end host EH1 to reach TCP port 80 of end host EH2) and may be partially applied at switch SW4 (e.g., the first entry of table 96C may only allow network packets from TCP port 80 of end host EH2 to reach end host EH1. This example is merely illustrative. If desired, virtual network policy may be partially implemented at any desired switch (or other packet forwarding system) along the identified network switch forwarding path between end hosts EH1 and EH2. The switches of the network switch forwarding path may be selected based on switch capabilities (e.g., switch SW3 may be the only switch in physical network 100 that is capable of decrementing time-to-live header fields, therefore any network switch routing path may be required to include switch SW3).

The network switch forwarding path generated by FIG. 10D is merely illustrative. If desired, controller server 18 may translate virtual network policy 92 into flow table entries for any physical network path between end hosts EH1 and EH2. For example, controller server 18 may identify a path through switches SW1, SW2, SW3, and SW4, through switches SW1, SW2, and SW4, etc.

Figure 11:
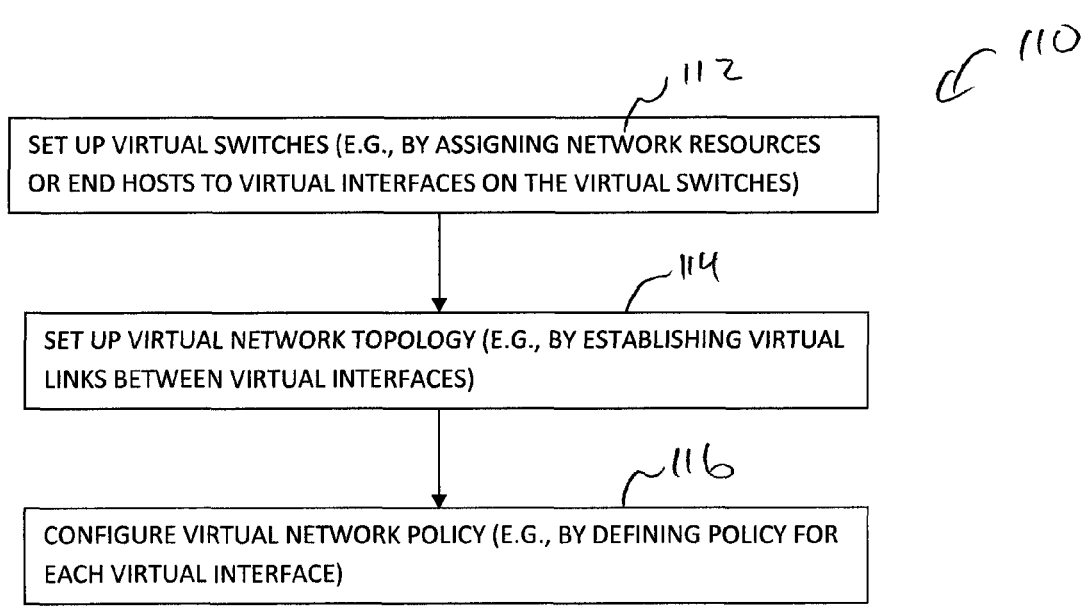
FIG. 11 is a flow chart of illustrative steps that may be performed using a controller server to generate a virtual network and apply virtual network policy to the generated virtual network in accordance with an embodiment of the present invention.

To generate a virtual network of virtual switches each corresponding to a subset of physical ports and/or end hosts of a physical network and to define network policy that controls the forwarding of network packets through the virtual network, the illustrative steps of flowchart 110 of FIG. 11 may be performed using controller server 18.

In step 112, controller server 18 may set up virtual switches. For example, controller server 18 may form a virtual switch by generating virtual interfaces for the virtual switch and assigning network elements (e.g., network switch ports) or end hosts to the virtual interfaces. As an example, controller server 18 may set up virtual switch VSW1 of FIG. 9 by generating virtual interface IF1 and assigning end host EH1 to virtual interface IF1 (e.g., by assigning end hosts with MAC address one to virtual interface IF1).

In step 114, controller server 18 may set up a virtual topology that determines network communications paths between switches. For example, controller server 18 may establish virtual links between virtual switches (e.g., between virtual interfaces of the virtual switches). Each virtual link may identify that at least some network traffic is allowed to pass between a first corresponding virtual interface and a second corresponding virtual interface. As an example, controller server 18 may set up the virtual topology of virtual network 100A by forming a virtual link between virtual switch VSW1 and virtual switch VSW2 (e.g., between virtual interface IF2 and virtual interface IF3).

In step 116, controller server 18 may configure virtual network policies for the virtual network. For example, controller server 18 may configure virtual network policies to form a virtual router (e.g., by configuring policies that route network traffic based on IP addresses), form a virtual bridge (e.g., by configuring policies that route network traffic based on MAC addresses), selectively modify or replace network packets, implement access control lists (e.g., by selectively blocking network packets), selectively duplicate network packets, selectively redirect network packets, log network packets (e.g., by selectively storing information relating to the network packets), or to generate alerts. To implement each virtual network policy, controller server 18 may determine corresponding virtual interface policies for the virtual interfaces. For example, to block network packets sent by a first end host from reaching a second end host, controller server 18 may identify virtual paths between the first and second end host and block the network packets at selected virtual interfaces along each identified virtual path.

Figure 12:
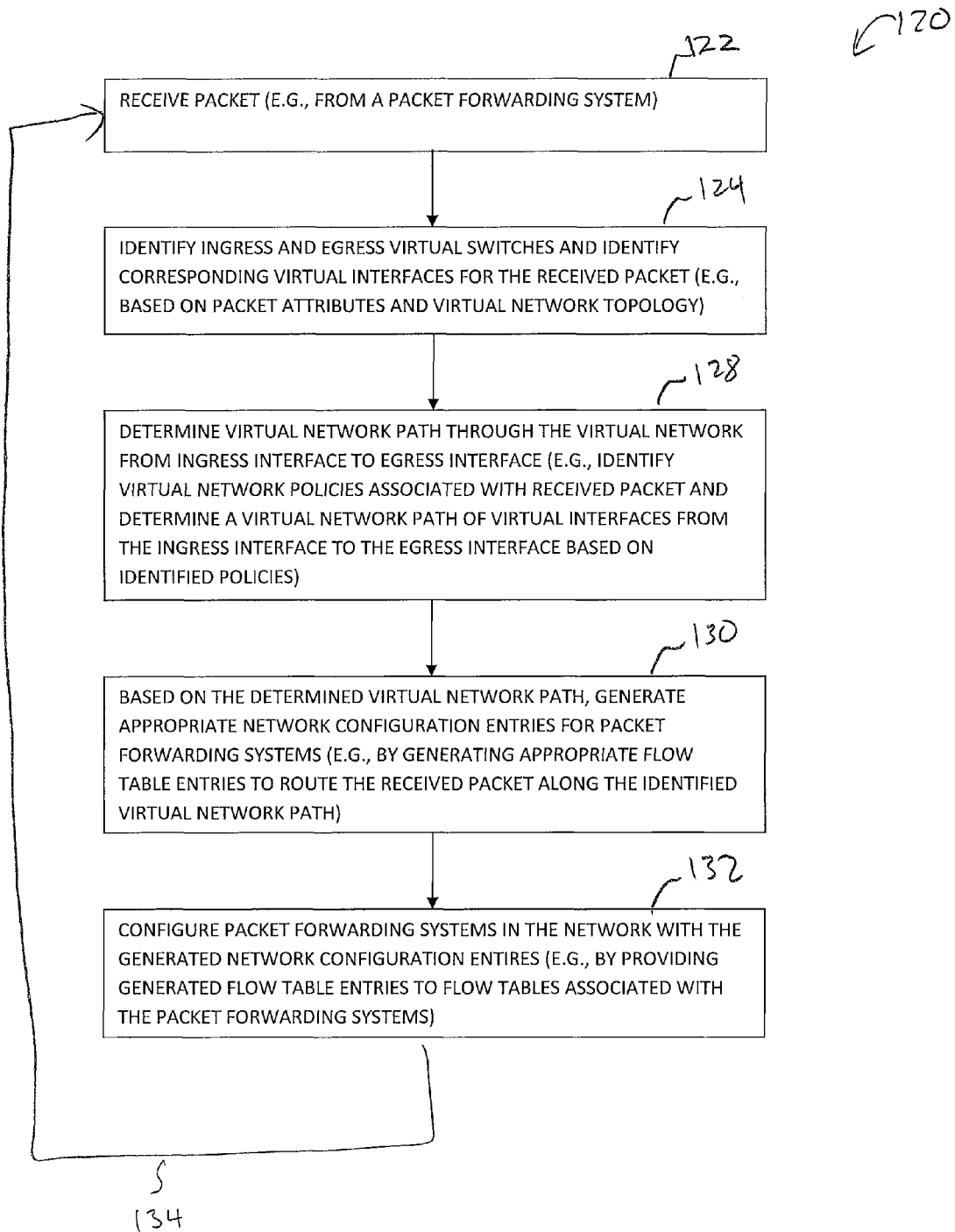
FIG. 12 is a flow chart of illustrative steps that may be performed by a controller server to apply virtual network policy to a corresponding physical network in accordance with an embodiment of the present invention.

To apply virtual network policies to a corresponding physical network that includes packet forwarding systems, the illustrative steps of FIG. 12 may be performed by controller server 18.

In step 122, controller server 18 may receive a network packet from a network switch (e.g., a client switch or other packet forwarding system). For example, a network packet may be received at a network switch. In this scenario, the network switch may identify that no forwarding path exists for the network packet (e.g., because no flow table entries for the packet currently exist in a flow table that corresponds to the network switch). The network switch may forward the network packet to controller server 18 in response to identifying that no forwarding path exists for the received network packet.

In step 124, controller server 18 may identify ingress and egress virtual switches and identify corresponding ingress and egress virtual interfaces for the received packet. Controller server 18 may identify the ingress and egress virtual switches based on attributes of the received packet (e.g., IP addresses, MAC addresses, etc.) and a virtual network topology. The ingress and egress virtual switches may be associated with a packet source end host and a packet destination end host. For example, controller server 18 may identify that the network packet has a packet source end host that is associated with a first virtual interface of an ingress virtual switch (e.g., an ingress virtual interface) and identify that the network packet has a packet destination end host that is associated with a second virtual interface of an egress virtual switch (e.g., an egress virtual interface).

In step 128, controller server 18 may determine a virtual network path through the virtual network from the ingress virtual interface to the egress virtual interface and identify virtual network policies associated with the virtual network path. The virtual network path may include one or more virtual interfaces (e.g., the path may include virtual links between virtual interfaces).

As an example, a virtual network path between end host EH1 and end host EH2 of FIG. 9 may include virtual interfaces IF1, IF2, IF3, and IF4. The virtual network path may include network policies such as network policy 92 of FIG. 10A that are associated with the virtual interfaces.

In step 130, controller server 18 may generate network configuration entries (e.g., flow table entries) for packet forwarding systems (e.g., physical network switches) based on the virtual network path and the associated virtual network policies. For example, controller server 18 may generate flow table entries for switches in physical network 100 that direct the switches to forward the network packet along a network switch forwarding path while satisfying virtual network policies. The network switch forwarding path may be selected based on capabilities of the physical switches. Implementation of the virtual network policies may be distributed throughout the network switch forwarding path (e.g., the virtual network policies may be implemented via flow table entries at selected switches in the network switch forwarding path).

In step 132, the packet forwarding systems in the network may be configured with the network configuration entries generated in step 130. For example, controller server 18 may provide each packet forwarding system with corresponding flow table entries that were generated in step 130. The process may then loop back to step 122 via path 134 to apply virtual network policies to packets received at packet forwarding systems.

Figure 13:
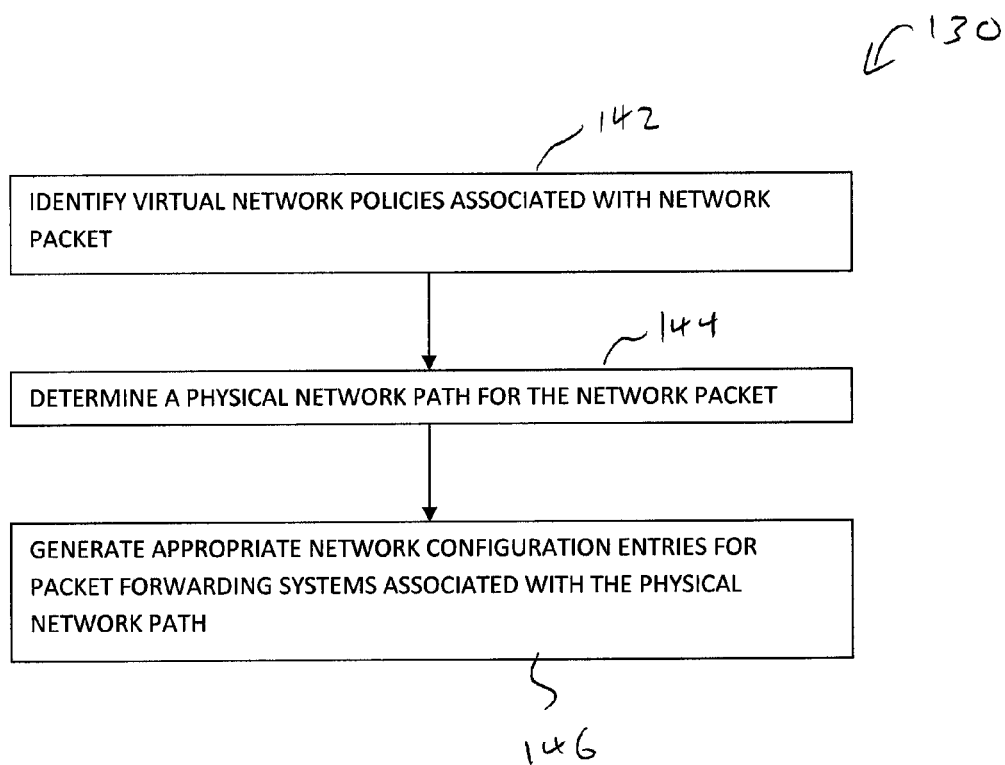
FIG. 13 is a flow chart of illustrative steps that may be performed using a controller server to generate flow table entries based virtual interface policies in accordance with an embodiment of the present invention.

FIG. 13 shows illustrative steps that may be performed by controller server 18 to generate network configuration entries for packet forwarding systems based on a determined virtual network path. If desired, the steps of FIG. 13 may be performed during step 130 of FIG. 12.

In step 142, controller server 18 may identify virtual network policies associated with a network packet (e.g., a network packet received in step 122 of FIG. 12). For example, controller server 18 may identify virtual interface policies that control network traffic between virtual switches.

In step 144, controller server 18 may determine a physical network path for the network packet. The physical network path may include network switches and network switch ports between a packet source and a packet destination. The physical network path may be determined based on physical network topology information (e.g., based on known network connections between physical network switches and/or based on network switch capabilities).

In step 146, controller server 18 may generate network configuration entries (e.g., flow table entries) based on the identified virtual network policies (e.g., flow table entries that route network packets through the physical network path while satisfying the identified virtual network policies). The network configuration entries may be provided to packet forwarding systems that are associated with the determined physical network path. The network configuration entries may be provided to the packet forwarding systems via network connections between controller server 18 and the packet forwarding systems.

The use of one or more centralized controller such as controller server 18 to control network switches is merely illustrative. If desired, any type of controller (e.g., a controller implemented on computing equipment) that controls a network of packet forwarding systems may be used to form virtual switches from groups of ports of corresponding packet forwarding systems and apply virtual network policies to control network traffic through the virtual switches.

Figure 14:
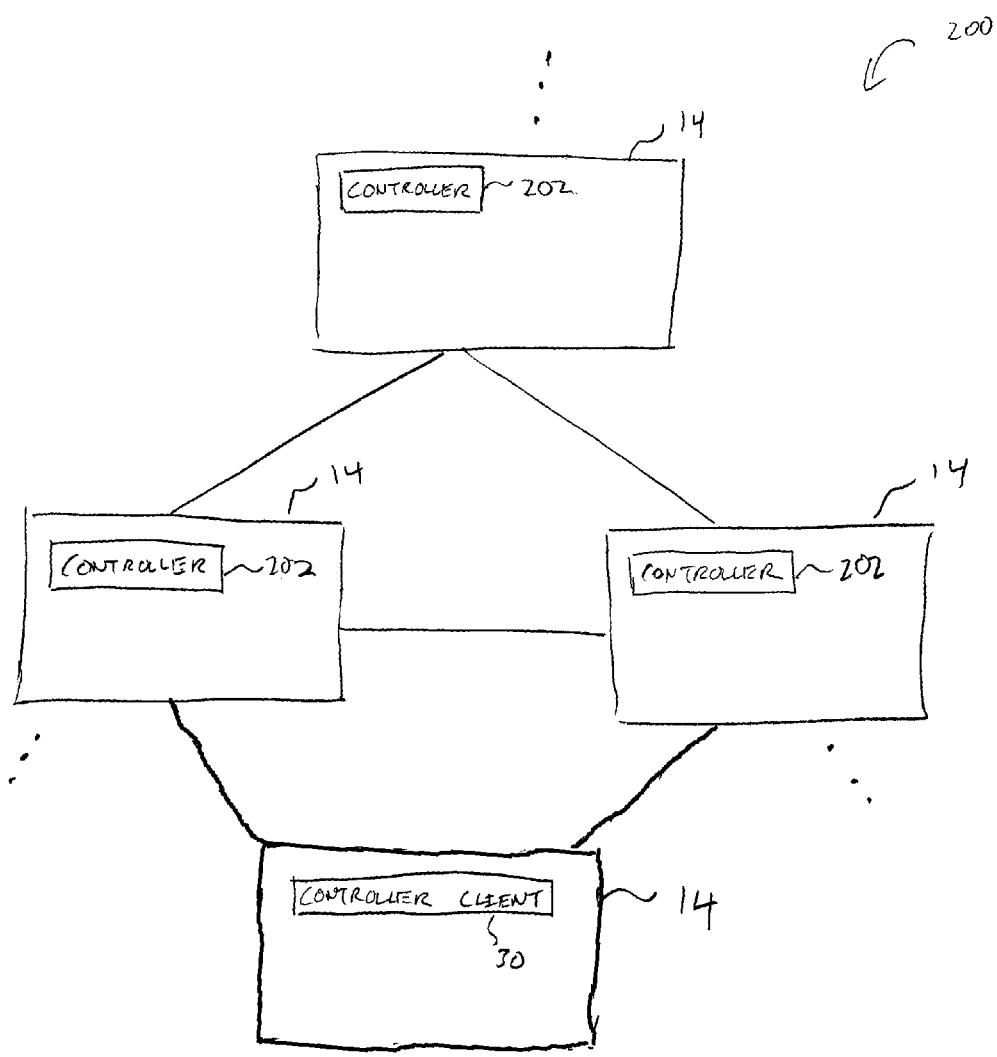
FIG. 14 is a diagram of an illustrative controller that may be distributed on packet forwarding systems in a network in accordance with an embodiment of the present invention.

FIG. 14 shows an illustrative example in which controllers 202 may be distributed on switches 14 throughout network 200. Controllers 202 may be distributed on some or all of network switches 14. Controller clients such as controller client 30 may communicate with one or more of controllers 202 via network communications links (e.g., controllers 202 may send instructions to controller client 30 via the communications links). Controllers 202 may communicate with each other to collectively control switches 14 or may individually control switches 14.

As an example, controllers 202 may collectively control network 200 by communicating with each other to form virtual switches. Controllers 202 may share information relating to network topology, network traffic, end hosts that are coupled to switches 14, etc. By sharing network information, controllers 202 may be able to form virtual switches from groups of ports on switches 14 (e.g., groups of ports that are dynamically determined based on physical ports, locations of end hosts that are coupled to the ports, or attributes of the end hosts) and apply virtual network policies to the virtual switches. The groups of physical ports that are used to form the virtual switches may overlap (e.g., an end host may be assigned to multiple different switches based on criteria such as the type of network traffic sent from that end host, the ports on which that end host communicates, etc.).

If desired, each controller 202 may individually control a corresponding switch 14 without communicating with other controllers 202. For example, each controller 202 may form virtual switches from groups of ports on a single corresponding physical switch 14 and apply network policies to the virtual switches formed from that corresponding physical switch 14.

The controllers may be implemented using resources of switches 14 such as storage and processing circuitry. Some of controllers 202 may have capabilities that are limited by the processing capabilities of a corresponding switch 14. In this scenario, the controllers 202 with limited capabilities may communicate with other controllers 202 to collectively apply network policies to virtual switches. Consider a scenario in which a first controller 202 is formed on a first switch 14 that has limited packet processing capabilities and a second controller 202 is formed on a second switch 14 that has more complex packet processing capabilities. To apply a network policy to a virtual switch formed from ports from the first and second switches, the first controller 202 may direct the first switch 14 to forward network packets to the second switch 14 (e.g., so that the second controller 202 may correctly process the network packets to satisfy the network policy).

The foregoing is merely illustrative of the principles of this invention and various modifications can be made by those skilled in the art without departing from the scope and spirit of the invention.

What is claimed is:

1. A method of forwarding packets from a packet source to a packet destination through a network of switches, wherein the switches include ports, wherein the switches are controlled by a controller that is separate from the switches and that is coupled to the switches via control paths, and wherein groups of the ports form respective virtual switches, the method comprising:
    with the controller, receiving one of the packets from a given one of the switches;
    with the controller, identifying, from information from the received packet that identifies the packet destination and packet source, a virtual path through the virtual switches from a first virtual switch associated with the packet source to a second virtual switch associated with the packet destination, wherein the first virtual switch and the second virtual switch include ports from at least two different switches;
    with the controller, identifying a packet forwarding path through the switches from the packet source to the packet destination based on the virtual path and a network policy; and
    with the controller, generating the packet forwarding path by sending control messages to each of the switches in the packet forwarding path.

2. The method defined in claim 1 wherein the control messages comprise flow table entries and wherein identifying the packet forwarding path comprises generating the flow table entries based at least partly on the network policy.

3. The method defined in claim 1 wherein identifying the packet forwarding path comprises identifying network switch capabilities associated with at least a given one of the switches.

4. The method defined in claim 3 wherein identifying the network switch capabilities comprises determining whether the given one of the switches is capable of modifying the packets.

5. The method defined in claim 1 wherein the network policy specifies that at least some of the packets should be dropped.

6. The method defined in claim 5 wherein generating the forwarding path comprises generating a flow table entry for at least a given one of the switches that directs the given one of the switches to drop packets.

7. The method defined in claim 1 wherein the network policy specifies that the packets should be allowed to flow along the forwarding path from the packet source to the packet destination.

8. The method defined in claim 7 wherein generating the forwarding path comprises:
    generating flow table entries for the switches in the forwarding path to forward the packet from the packet source to the packet destination.

9. The method defined in claim 1 further comprising:
    identifying which of a plurality of network protocols is associated with the packets; and
    identifying which of a plurality of network policies to use as the network policy based on which of the protocols has been identified as being associated with the packets.

10. The method defined in claim 9 further comprising:
    identifying which of a plurality of network policies to use as the network policy by determining which of the plurality of network policies is associated with the packet source.

11. The method defined in claim 1 further comprising:
    identifying which of a plurality of network policies to use as the network policy by determining which of the plurality of network policies is associated with the packet destination.

12. The method defined in claim 1 wherein the first virtual switch contains ports from at least two of the switches.

13. The method defined in claim 1 wherein the first virtual switch contains no more than a subset of the ports from a given one of the switches and contains at least some ports from at least an additional one of the switches.

14. The method defined in claim 1 wherein the packet source has a network address, the method further comprising:
    dynamically determining which port to include in the group of ports for the first virtual switch based on the network address.

15. The method defined in claim 1 further comprising:
    with the controller, determining which ports to include in each of the groups of ports based on user input received by the controller.

16. A method of using a controller to forward a packet from a packet source to a packet destination through a network of switches, wherein the controller controls a plurality of the switches of the network and wherein the switches include ports and wherein groups of the ports form respective virtual switches, the method comprising:
    with the controller, receiving the packet;
    with the controller, identifying an ingress virtual switch from among the virtual switches based on information from the packet that identifies the packet source;
    with the controller, identifying an egress virtual switch from among the virtual switches based on information from the packet that identifies the packet destination, wherein the packet source has a network address; and
    with the controller, dynamically determining which port to include in the group of ports for the ingress virtual switch based on the network address of the packet source.

17. The method defined in claim 16 further comprising:
    with the controller, identifying a virtual path from the ingress virtual switch to the egress virtual switch.

18. The method defined in claim 17 further comprising:
    with the controller, identifying which network policy of a plurality of network policies to apply to the virtual path.

19. The method defined in claim 18 further comprising:
    with a controller, generating a forwarding path through the switches based on the identified network policy and the identified virtual path.

20. The method defined in claim 17 further comprising:
    with the controller, receiving information from a user that identifies a given one of the ports at which to apply the identified network policy to the packet.

21. A method of forwarding a packet from a packet source to a packet destination through a network of switches, wherein the switches include ports and wherein groups of the ports form respective virtual switches, the method comprising:
    with a controller, receiving information from a user identifying which group of ports is associated with each of the virtual switches;
    with the controller, receiving information from the user identifying a plurality of network policies;

with the controller, identifying, from information from the packet that identifies the packet destination and packet source, a virtual path through the virtual switches from a first virtual switch associated with the packet source to a second virtual switch associated with the packet destination; and with the controller, identifying a packet forwarding path through the switches from the packet source to the packet destination based on the virtual path and a network policy from among the plurality of network policies; and with the controller, controlling a plurality of the switches to generate the packet forwarding path; and with the controller, determining which ports to include in the first and second virtual switches based on user input received by the controller.

22. The method defined in claim 21 further comprising:
identifying from information in the packet which of a plurality of network protocols is associated with the packet; and identifying which of the plurality of network policies to use as the network policy based on which of the protocols has been identified as being associated with the packet.

23. The method defined in claim 21 further comprising:
obtaining information from the packet identifying which of a plurality of protocol ports is associated with the packet; and identifying which of the plurality of network policies to use as the network policy based on which of the protocol ports is associated with the packet.

24. The method defined in claim 21 wherein the controller comprises a controller that is external to the switches.

25. The method defined in claim 16, wherein the controller is formed separate formed the switches, wherein the controller controls the plurality of the switches to generate the packet forwarding path by providing flow table entries to the plurality of the switches over control paths, and wherein the ingress and egress virtual switches each include ports from at least two different switches.

* * * * *